Patented May 20, 1930

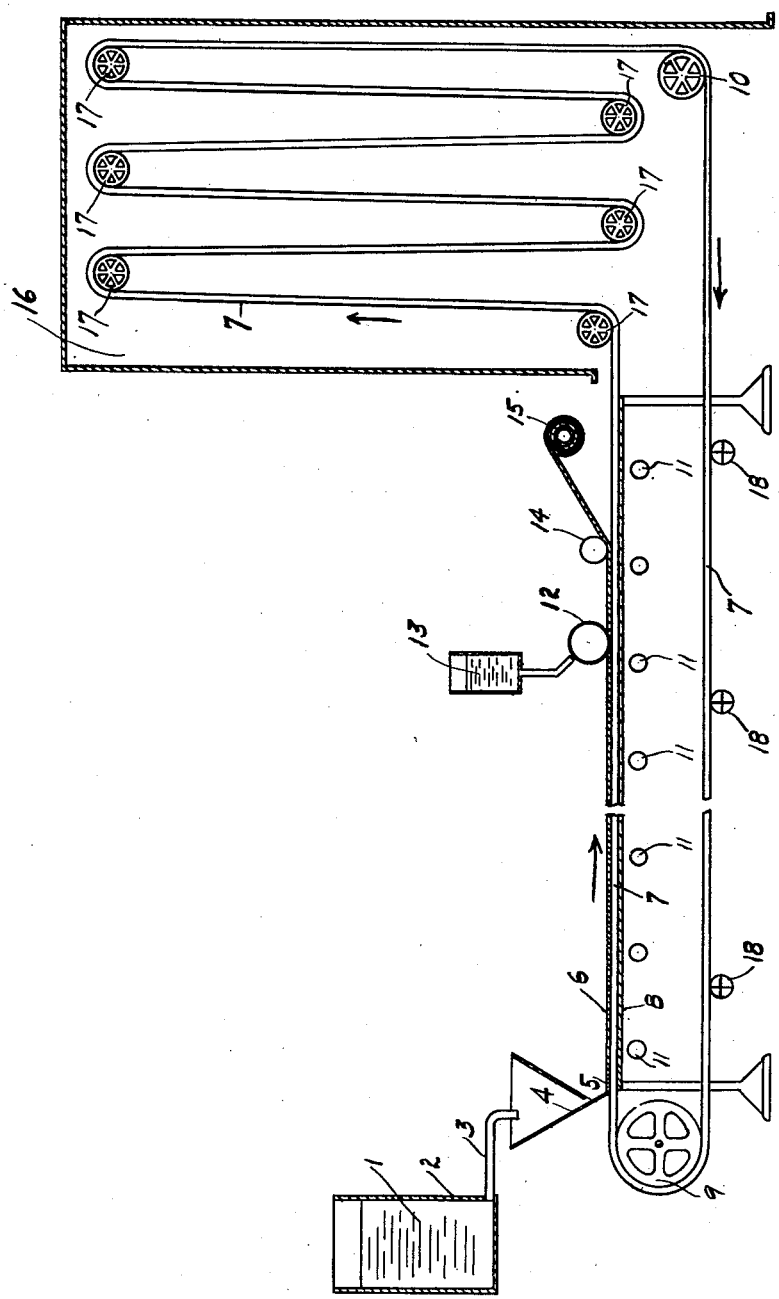

1,759,618

UNITED STATES PATENT OFFICE

ERNEST HOPKINSON, OF NEW YORK, AND WILLIS A. GIBBONS, OF LITTLE NECK, NEW YORK, ASSIGNORS TO GENERAL RUBBER COMPANY, OF NEW YORK, N. Y., A CORPORATION OF NEW JERSEY

MANUFACTURE OF RUBBER ARTICLES

Application filed June 12, 1925. Serial No. 36,586.

The customary method of making sheets or strips of rubber is to prepare a rubber batch in the usual way upon a mixing mill and then to calender the bath into sheets. If strips are to be made from a sheet of rubber, the sheet is simply cut to the desired width by any suitable cutting apparatus. The present invention aims to make such sheets or strips directly from rubber latex either artificial or natural and preferably containing compounding ingredients. The advantage of the present invention lies in the fact that an increased strength is obtained in the sheet or strip on account of the absence of any milling operations during the preparation of the sheet. In other words the finished product has all of the valuable properties of unmilled rubber. There are also advantages to be gained in a reduction of the cost of the finished article due to the obviation of the expensive milling machinery and operation of such machines.

The primary object of the invention therefore is to provide an economical means for preparing sheets or strips of rubber directly from an aqueous dispersion or latex. Another object of the invention is to provide a process for continuously forming sheets or strips or threads of rubber. Other objects will be apparent from the detailed description and claims.

With a preferred method in mind but not desiring to place undue limitations upon the scope of the invention beyond what may be required by the prior art, the invention consists in continuously depositing a layer of rubber from an aqueous dispersion thereof upon a pervious moving surface, withdrawing the aqueous portion of the dispersion, and completing the drying and vulcanization of the layer or rubber. The invention also includes separating the layer of rubber into strips preferably before the layer has become completely dried. The drawing shows an apparatus with which the invention can be carried out satisfactorily, but the invention is not limited to this particular form of apparatus.

Referring to the drawing, 1 represents a body of the rubber dispersion in a supply tank 2, and delivered through a pipe 3 into a hopper 4 at the base of which is set a trough or spout 5. The layer of rubber 6 is deposited on a pervious starched belt 7 which rests upon a rigid table 8 and is carried along over the table by means of pulleys 9 and 10. Beneath the rigid table 8 are steam pipes 11 which serve to remove moisture from the layer of rubber as it deposits. A series of cutting knives 12 are revolvably located in contact with belt 7. And upon the knives 12 a coagulant is made to drip from a supply tank 13. The separated strips of rubber are drawn over the rollers 14 and wound up on the spindle 15. The belt passes into a drying chamber 16 and is festooned therein over rollers 17 and withdrawn after drying over the pulley 10. During its return to the feed hopper 4 the belt may be supported on idler rollers 18.

In operating the invention the dispersion of rubber is supplied from the tank 2 through the pipe 3 into the hopper 4 and is transmitted to the belt 7 by means of trough 5. The belt 7 is preferably a matted association of fibres, such as felt, or it may be a woven or braided fabric, the essential being that it shall be pervious to the aqueous portion of the dispersion but not to the rubber particles therein. The layer of rubber designated in the drawing as 6 deposits smoothly and evenly upon the moving surface, and by virtue of the nature of the belt 7 tends to deposit its rubber while the aqueous portion filters through the belt. If it be desired to manufacture sheets of rubber, the layer of rubber is carried along upon the belt until it is approximately dry, when it is detached. By first coating the belt with starch or other material the rubber sheet may be detached without difficulty. The starch may be dusted on as a powder, or the belt may be treated with a starch solution and subsequently dried and ironed. If it be desired to make strips or thread directly from a sheet, this may be readily accomplished by placing in contact with the sheet of rubber, before the latter is dry, a series of cutting blades, illustrated as 12. These cutting blades or knives spaced in a row at any predetermined distance apart, may be used while the layer of rubber is still quite wet, in which case it is preferable to supply a small amount of a latex coagulant such as acetic acid or alcohol or a mixture or other suitable coagulant, directly to the knives. The knives press down into the soft layer of rubber, and penetrate through to the belt to separate the layer into strips, the margins of the strips being fairly well pronounced on account of the use of the coagulant on the knives. This has a tendency to harden the strips or threads at the moment they are cut and thus prevent them from sticking together after they have passed the knives, and it also facilitates the separation of the strips at the rollers 14. Instead of dripping the coagulant onto the knives, it may also be applied to the layer of rubber by spraying or painting prior to the cutting operation. If it be desired to dry the strips completely, suitable drying chambers may be provided before the strips are wound up on the spindles 15. Where vulcanization is desired, one way of accomplishing it is by employing a rubber dispersion which contains suitable vulcanizing ingredients, and the vulcanization may be made practically complete before the strips are removed from the belt which travels over a heated table. The belt after the layer of rubber has been removed, say at the roller 14, may then be passed through a drying chamber 16 wherein it may be festooned over rollers 17 in order to remove all of the moisture which it may have retained after its passage over the table 8. The dried belt then passes along over the pulley 10 and over the idler rollers 18 and the pulley 9 back to the trough 5 to receive a fresh deposit of the rubber dispersion. By regulating the length of the drying table 8 the operation can be made continuous.

The invention is not limited to the particular form of apparatus described above, for a number of modifications may be made without affecting the modus operandi. For example, the drying chamber may be omitted entirely and the belt may be dried during its return passage to the hopper 4 by causing the belt to pass directly beneath the heating coils 11. The distance between the delivery trough 5 and the knives 12 may be varied. It is preferable to have the knives 12 and coagulant tank 13 slidably mounted with reference to the belt, in order that the drying period of the layer of rubber may be increased or decreased, according as the heat supplied by the coils 11 is changed or as the composition of the rubber dispersion is varied. With a few minor alterations, an ordinary rubber spreading or coating machine may be employed.

The above process is made possible by the fact that certain ingredients may be added to rubber latex or to artificial dispersions of rubber so that the latex or the dispersion may be filtered and at the same time will deposit the rubber particles upon the filtering medium. As an example of a composition which may be used in carrying out this invention, the following may be employed: Ordinary rubber latex which has been preserved with ammonia is freed of the ammonia and then treated with ½% of phenol and 0.06% of trisodium phosphate. Using this treated latex, the following composition is prepared: 100 parts rubber as latex, 1 part zinc oxide, 2 parts precipitated sulphur, ½ part oxy normal butyl thiocarbonic acid disulphide, ¼ part dibenzylamine, 1¾ parts glue, 1½ parts solvent naphtha.

The various ingredients are mixed with the latex in the form of emulsions. The zinc oxide and sulphur are mixed to a thick mush with water and added to a water solution of glue and thoroughly mixed. The oxy normal butyl thiocarbonic acid disulphide is mixed with the solvent naphtha and emulsified with a water solution of glue in the presence of a small amount of sodium oleate. The dibenzylamine is emulsified in the same way. The above composition allowed to stand for several weeks, becomes vulcanized and thickens somewhat. This vulcanized latex composition has the property of filtering rapidly, or depositing its solid portion upon a pervious filtering medium while the aqueous portion passes through the medium. When used in the above described manner for making sheets or strips of rubber, this composition is fed on to the belt as described above.

Another example which may be used with equal satisfaction in the above process is made up from latex which has just been treated to remove a portion of its water soluble constituents, without coagulation:

100 parts of rubber as latex (containing 33% solids), 80 parts of gilders' whiting, 20 parts of mineral flour, 3½ parts of colloidal sulphur, 1 part of zinc oxide, 1 part of glue, ½ part of zinc dimethyldithiocarbamate.

The fillers are added in the form of a water paste, and sufficient ammonia is added to bring the ammonia concentration up to 1%. A further amount of water is added to make a total of 145 parts of water. This composition when used in the above invention will form a deposit upon the belt approximately .069 inches thick in 2 hrs.

Another composition consists of ammonia preserved latex (containing 30–35% of solids) treated with a solution of calcium polysulphide to give 0.34 parts by weight of solid calcium polysulphide to 100 parts by weight of latex. Other compounding ingredients may be added to this composition, if desired.

Having thus described our invention, what we claim and desire to protect by Letters Patent is:

1. A process for manufacturing sheets or strips of rubber which consists in continuously depositing rubber from an aqueous quick filtering dispersion thereof upon a moving web of filtering material and withdrawing the aqueous portion of the dispersion by filtration, and continuously detaching the rubber deposited on said web without interruption of its movement.

2. A process for manufacturing sheets and strips of rubber which consists in continuously depositing rubber from an aqueous dispersion thereof upon a moving pervious web of filtering material, continually withdrawing water from said layer during its travel, separating the layer into strips of predetermined width, and detaching the strips from the web separated from each other.

3. A process for manufacturing sheets and strips of rubber which consists in continuously depositing rubber from an aqueous dispersion thereof upon a moving pervious web of filtering material, continually withdrawing water from said layer during its travel, separating the layer into strips of predetermined width, detaching the strips from the web separated from each other, and drying the web before depositing a fresh layer of rubber thereon.

4. A process for manufacturing sheets and strips of rubber which consists in depositing a layer of rubber from a compounded latex upon a moving pervious web of associated fibres, withdrawing the aqueous portion of the latex through said web, supplying heat beneath the web in order to hasten drying of the layer, and detaching the coherent continuous sheet of rubber from the web in a continuous operation.

5. A process for manufacturing sheets and strips of rubber which consists in depositing a layer of rubber from a compounded latex upon a moving pervious web of associated fibres, withdrawing the aqueous portion of the latex through said web, supplying heat to the web in order to hasten drying of the layer, cutting the partially dried layer of rubber by knives wet with a latex coagulant, detaching and separately recovering the strips thus formed.

Signed at New York, New York, this 21st day of May, 1925.

ERNEST HOPKINSON.

Signed at New York, New York, this 5th day of June, 1925.

WILLIS A. GIBBONS.